United States Patent
Ghazikhanian et al.

(10) Patent No.: US 11,079,222 B2
(45) Date of Patent: Aug. 3, 2021

(54) RADIATION-BASED THICKNESS GAUGE

(71) Applicant: NDC Technologies Inc., Dayton, OH (US)

(72) Inventors: Vahe Ghazikhanian, Glendale, CA (US); Ahmad R. Shishegar, Woodland Hills, CA (US)

(73) Assignee: NDC Technologies Inc., Dayton, OH (US)

( * ) Notice: Subject to any disclaimer, the term of this patent is extended or adjusted under 35 U.S.C. 154(b) by 0 days.

(21) Appl. No.: 16/775,737

(22) Filed: Jan. 29, 2020

(65) Prior Publication Data

US 2020/0240776 A1    Jul. 30, 2020

Related U.S. Application Data

(60) Provisional application No. 62/799,001, filed on Jan. 30, 2019.

(51) Int. Cl.
   *G01B 15/02*    (2006.01)
   *G01N 23/087*   (2018.01)
   (Continued)

(52) U.S. Cl.
   CPC ......... *G01B 15/025* (2013.01); *G01N 23/087* (2013.01); *G01N 23/203* (2013.01);
   (Continued)

(58) Field of Classification Search
   None
   See application file for complete search history.

(56) References Cited

U.S. PATENT DOCUMENTS 3,417,243 A * 12/1968 Hill ............... G01N 23/223
                                          378/50
3,955,086 A *  5/1976 Tsujii ............. G01N 23/16
                                          378/56
(Continued)

FOREIGN PATENT DOCUMENTS

CN    201177501    1/2009
CN    101893432    11/2014
(Continued)

OTHER PUBLICATIONS

Artemiev et al. "New Detectors for X-Ray Metal Thickness Measuring," European Conference on Non-Destructive Testing, Sep. 25-29, 2006, Berlin, Germany; 7 pages.
(Continued)

*Primary Examiner* — Thomas R Artman
(74) *Attorney, Agent, or Firm* — Morrison & Foerster LLP

(57) ABSTRACT

Described are system and method embodiments for measuring a thickness of a material layer using electromagnetic radiation. In some embodiments, a system includes a radiation source configured to direct first radiation towards a first surface of a layer of material having a thickness between the first surface and a second surface opposite the first surface. The first radiation causes the material layer to emit secondary radiation. A filter is positioned between the material layer and a radiation detector and in the beam path of the second radiation in order to attenuate a portion of the second radiation associated with fluorescence of the material to emit third radiation. Then, the radiation detector is configured to detect the third radiation and a controller is configured to provide a measurement corresponding to the thickness of the material layer based on the detected third radiation.

46 Claims, 4 Drawing Sheets

Figure 1A:
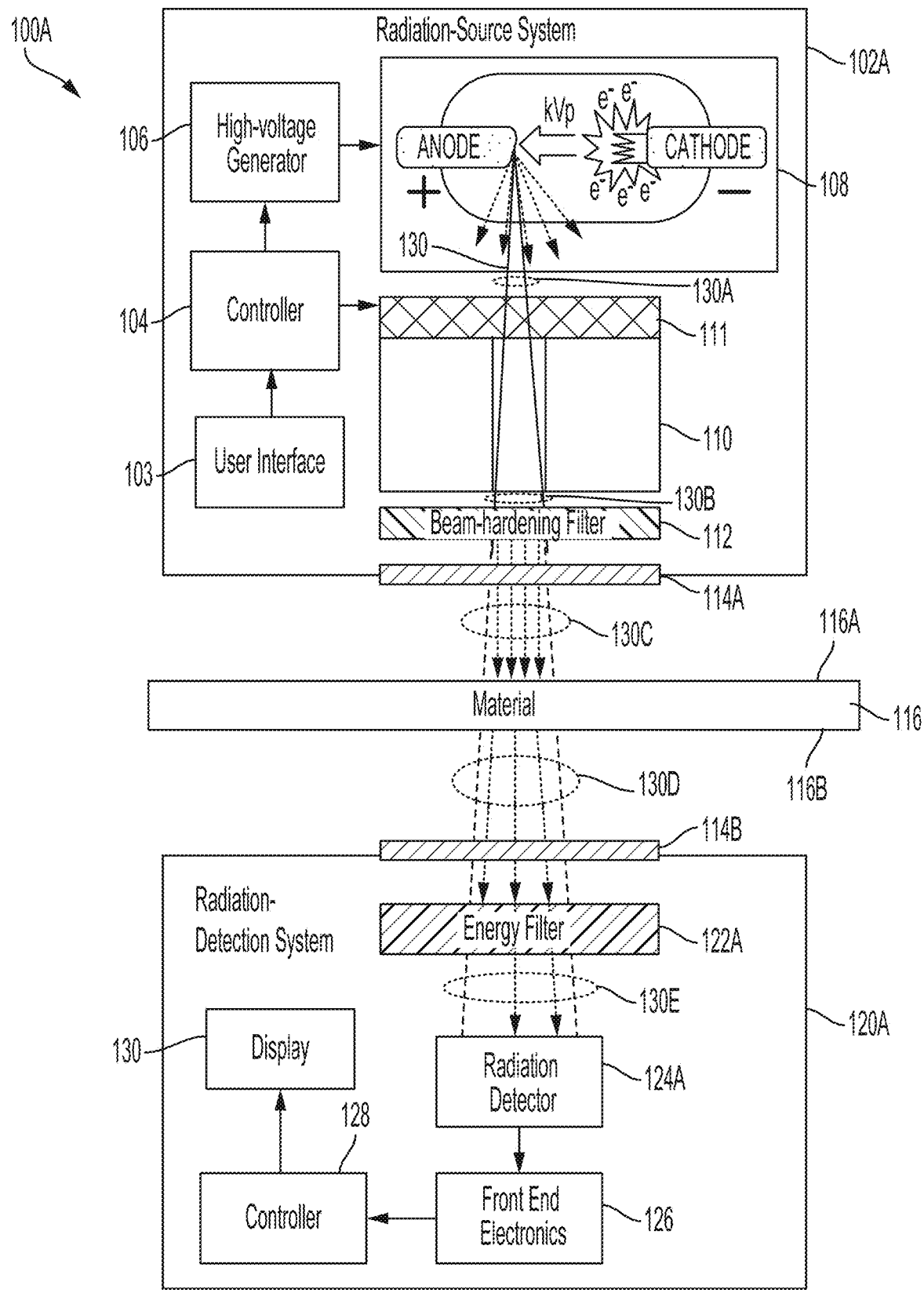

(51) Int. Cl.
*G01N 23/20066* (2018.01)
*G01N 23/203* (2006.01)

(52) U.S. Cl.
CPC ............. *G01N 23/20066* (2013.01); *G01N 2223/1013* (2013.01); *G01N 2223/1016* (2013.01); *G01N 2223/313* (2013.01); *G01N 2223/633* (2013.01)

(56) References Cited

U.S. PATENT DOCUMENTS

| | | | | |
|---|---|---|---|---|
| 5,255,302 | A * | 10/1993 | Shimamune | G01B 15/025 378/55 |
| 8,454,234 | B2 * | 6/2013 | Ciani | G01B 15/025 378/199 |
| 9,036,778 | B2 * | 5/2015 | Olszewski | G01N 23/223 378/46 |
| 9,513,238 | B2 | 12/2016 | Kessler | |
| 9,671,222 | B2 | 6/2017 | Maierhofer | |
| 2011/0026672 | A1 * | 2/2011 | Ciani | G01B 15/025 378/54 |
| 2012/0328075 | A1 * | 12/2012 | Olszewski | G01N 33/208 378/50 |
| 2020/0240776 | A1 * | 7/2020 | Ghazikhanian | G01N 23/20066 |

FOREIGN PATENT DOCUMENTS

| | | |
|---|---|---|
| CN | 102607476 | 7/2016 |
| CN | 106197550 | 12/2016 |
| DE | 10345754 A1 | 4/2005 |
| EP | 0592520 | 9/1996 |
| WO | 92/16819 A1 | 10/1992 |

OTHER PUBLICATIONS

"Nuclear Instrumentation: Thickness Measurement Systems Utilizing Ionizing Radiation—Definitions and Test Methods" (Nov. 1996) International Electrotechnical Commission; 82 pages.
International Search Report and Written Opinion dated May 20, 2020, directed to International Application No. PCT/US2020/015615; 14 pages.

* cited by examiner

RADIATION-BASED THICKNESS GAUGE

CROSS-REFERENCE TO RELATED APPLICATIONS

This application claims the benefit of U.S. Provisional Application No. 62/799,001, filed Jan. 30, 2019, the entire contents of which are incorporated herein by reference.

FIELD OF THE DISCLOSURE

This disclosure relates generally to system and methods for measuring a thickness of a layer of a material using electromagnetic radiation.

BACKGROUND OF THE DISCLOSURE

Radiation-based gauges typically operate by directing an electromagnetic radiation beam at a layer of material and measuring a characteristic of the material layer based on an amount of attenuation of the radiation beam passing through the material layer. Attenuation occurs due to the interaction between photons of the radiation beam and particles (e.g., atoms) within the material layer. The total attenuation at photon energies below about 1.022 MeV is a result of a combination of the following four types of radiation-matter interactions: photoelectric, Compton scattering, pair production, and Thomson or Rayleigh scattering. The accuracy and measurement sensitivity of the radiation-based gauges depends on the characteristics of these radiation-matter interactions with respect to the material composition.

SUMMARY OF THE DISCLOSURE

In industrial manufacturing, radiation-based gauges are typically X-ray thickness gauges that transmit X-ray beams at energy levels below 500 KeV to measure a range of thicknesses for select material layers. In this energy range, the attenuation of the X-rays passing through a material layer is predominantly caused by the photoelectric effect. The photoelectric effect refers to the process in which energy of a photon in the radiation beam is absorbed by an atom within the material layer, thereby removing that photon from the radiation beam and reduces the total beam intensity (i.e., sometimes referred to as irradiance).

The photoelectric effect is inherently a non-linear process and depends on a composition of the material layer. In particular, an electron of the atom may be excited to a higher energy state at several different discrete photon energies, e.g., K-edges, depending on orbital shell characteristics of the atom and subsequently decays to emit a photon of lower energy. Accordingly, the photoelectric effect may cause the material layer to emit fluorescent radiation including these lower-energy photons. This fluorescent radiation may reduce the measurement accuracy or precision of the X-ray thickness gauges, which limits the types of material compositions whose thickness can be measured.

In some embodiments, to reduce an amount of this florescent radiation, the X-ray thickness gauge can be configured to transmit X-rays having energy levels below K-edges of many materials (e.g., below 5 keV). At these lower energy levels, however, attenuation of the X-ray through the material layer is very high, which severely limits the range of material thickness that can be measured.

In some embodiments, to reduce a sensitivity of a material layer thickness measured by a radiation-based gauge and thereby improve accuracy of the measured thickness, the radiation-based gauge can be configured to filter and prevent at least a portion of the fluorescence radiation emitted by the material layer from being detected. This approach overcomes the disadvantages of using low-energy radiation sources without losing measurement sensitivity.

In some embodiments, a system for measuring a thickness of a material layer using electromagnetic radiation comprises: a radiation source configured to direct first radiation towards a first surface of a layer of material comprising a thickness between the first surface and a second surface opposite the first surface, wherein the first radiation causes the material layer to emit second radiation; a filter positioned between the material layer and a radiation detector and configured to attenuate a portion of the second radiation associated with fluorescence of the material to emit third radiation, wherein the radiation detector is configured to detect the third radiation; and a controller is configured to provide a measurement corresponding to the thickness of the material layer based on the detected third radiation.

In some embodiments of the system, the filter comprises one or more filter layers that are configured to filter a range of energy levels associated with the fluorescence of the material layer.

In some embodiments of the system, the range of energy levels is predetermined based on an elemental composition of the material layer and orbital shell characteristics associated with each element in the elemental composition.

In some embodiments of the system, the filter is configured to filter from the second radiation photons having an energy level below a predetermined threshold.

In some embodiments of the system, the predetermined threshold is associated with an elemental composition of the material layer and orbital shell characteristics associated with each element in the elemental composition.

In some embodiments of the system, the first radiation comprises X-rays.

In some embodiments of the system, the first radiation comprises gamma radiation.

In some embodiments of the system, the radiation source and the radiation detector are disposed on opposite sides of the material layer.

In some embodiments of the system, the radiation source and the radiation detector are disposed on the same side of the material layer.

In some embodiments of the system, the measurement comprises a unit of length.

In some embodiments of the system, the measurement comprises an area density.

In some embodiments of the system, the first radiation comprises a predetermined energy level and to provide the measurement, the controller is configured to: measure an intensity of the third radiation; and calculate the measurement corresponding to the thickness of the material layer based on the measured intensity and a default intensity associated with no material layer.

In some embodiments of the system, to provide the measurement, the controller is configured to: apply a logarithmic function to the measured intensity to determine a log value; and apply a polynomial function to the log value to calculate the measurement, wherein the coefficients in the polynomial function are predetermined based on an elemental composition of the material layer and a range of thicknesses of the material layer to be measured.

In some embodiments of the system, the system includes a display configured to display the measurement corresponding to the thickness of the material layer.

In some embodiments, a method for measuring a thickness of a material layer using electromagnetic radiation includes: directing first radiation from a radiation source towards a first surface of a layer of material comprising a thickness between the first surface and a second surface opposite the first surface, wherein the first radiation received at the first surface causes the material layer to emit second radiation; attenuating a portion of the second radiation associated with fluorescence of the material layer to emit third radiation; detecting the third radiation at a radiation detector; and providing a measurement corresponding to the thickness of the material layer based on the detected third radiation.

In some embodiments of the method, the portion of the second radiation is attenuated by a filter comprising one or more filter layers that are configured to filter a range of energy levels associated with the fluorescence of the material layer.

In some embodiments of the method, the range of energy levels is predetermined based on an elemental composition of the material layer and orbital shell characteristics associated with each element in the elemental composition.

In some embodiments of the method, the portion of the second radiation is attenuated by a filter configured to filter from the second radiation photons having an energy level below a predetermined threshold.

In some embodiments of the method, the predetermined threshold is associated with an elemental composition of the material layer and orbital shell characteristics associated with each element in the elemental composition.

In some embodiments of the method, the first radiation comprises X-rays.

In some embodiments of the method, the first radiation comprises gamma radiation.

In some embodiments of the method, the radiation source and the radiation detector are disposed on opposite sides of the material layer.

In some embodiments of the method, the radiation source and the radiation detector are disposed on the same side of the material layer.

In some embodiments of the method, the measurement comprises a unit of length.

In some embodiments of the method, the measurement comprises an area density.

In some embodiments of the method, the first radiation comprises a predetermined energy level and providing the measurement comprises: measuring an intensity of the third radiation; and calculating the measurement corresponding to the thickness of the material layer based on the measured intensity and a default intensity associated with no material layer.

In some embodiments of the method, providing the measurement comprises: applying a logarithmic function to the measured intensity to determine a log value; and applying a polynomial function to the log value to calculate the measurement, wherein the coefficients in the polynomial function are predetermined based on an elemental composition of the material layer and a range of thicknesses of the material layer to be measured.

In some embodiments of the method, the method includes displaying the measurement corresponding to the thickness of the material layer.

BRIEF DESCRIPTIONS OF THE DRAWINGS

Figure 1B:
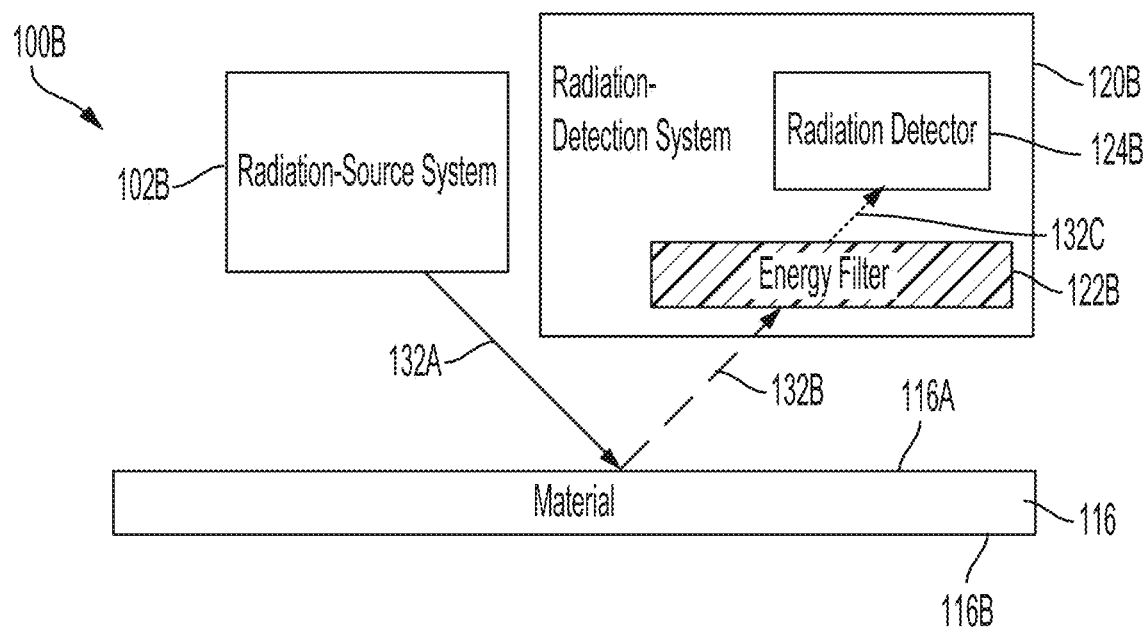
Figure 1C:
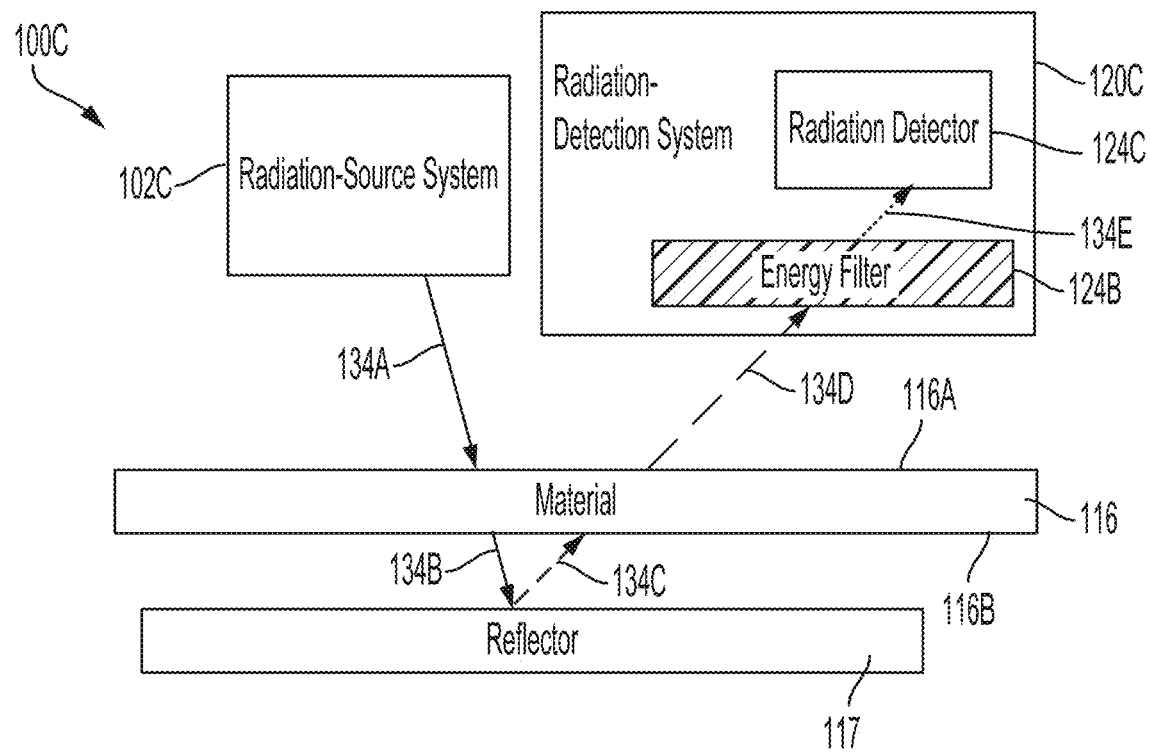
Figure 2:
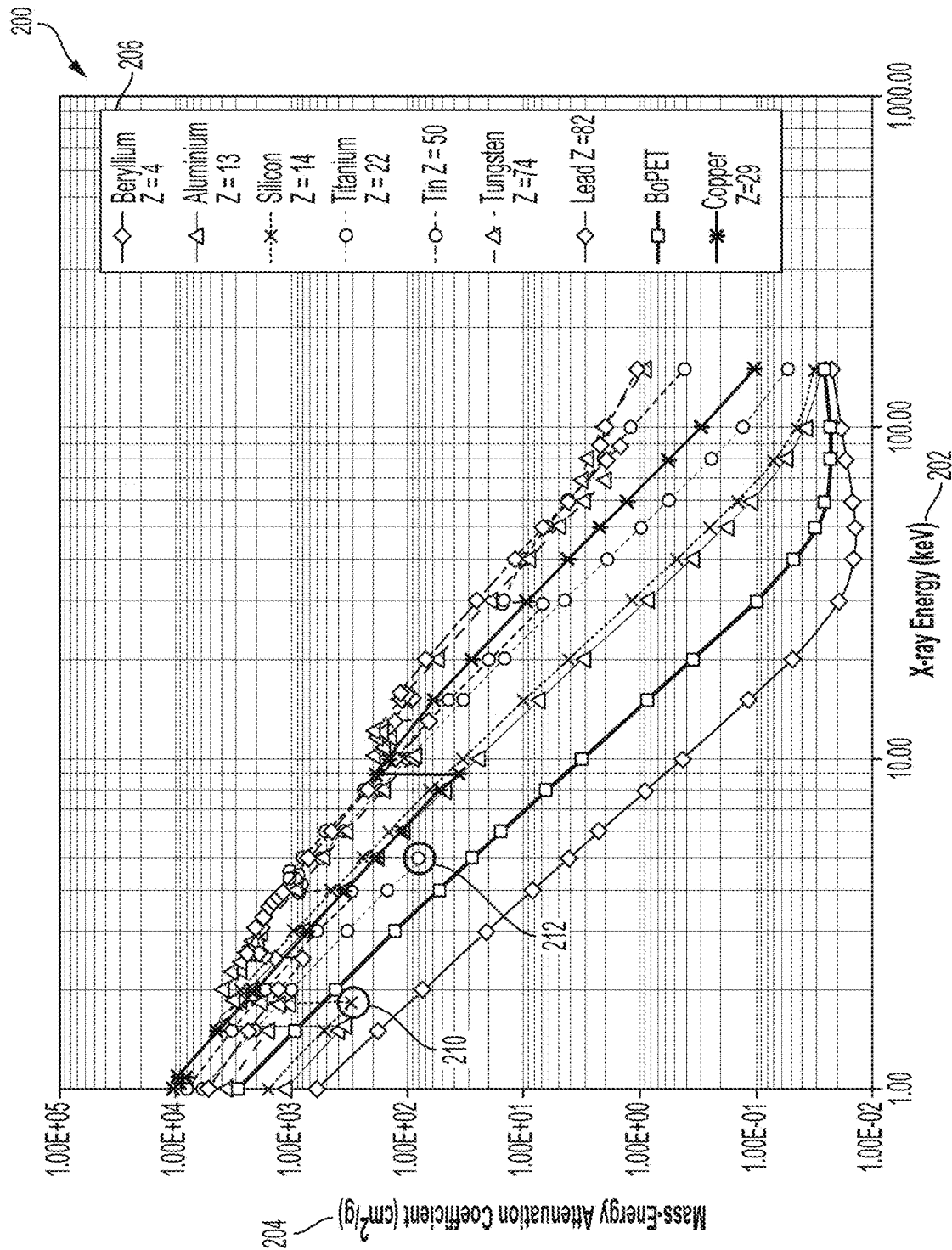
Figure 3:
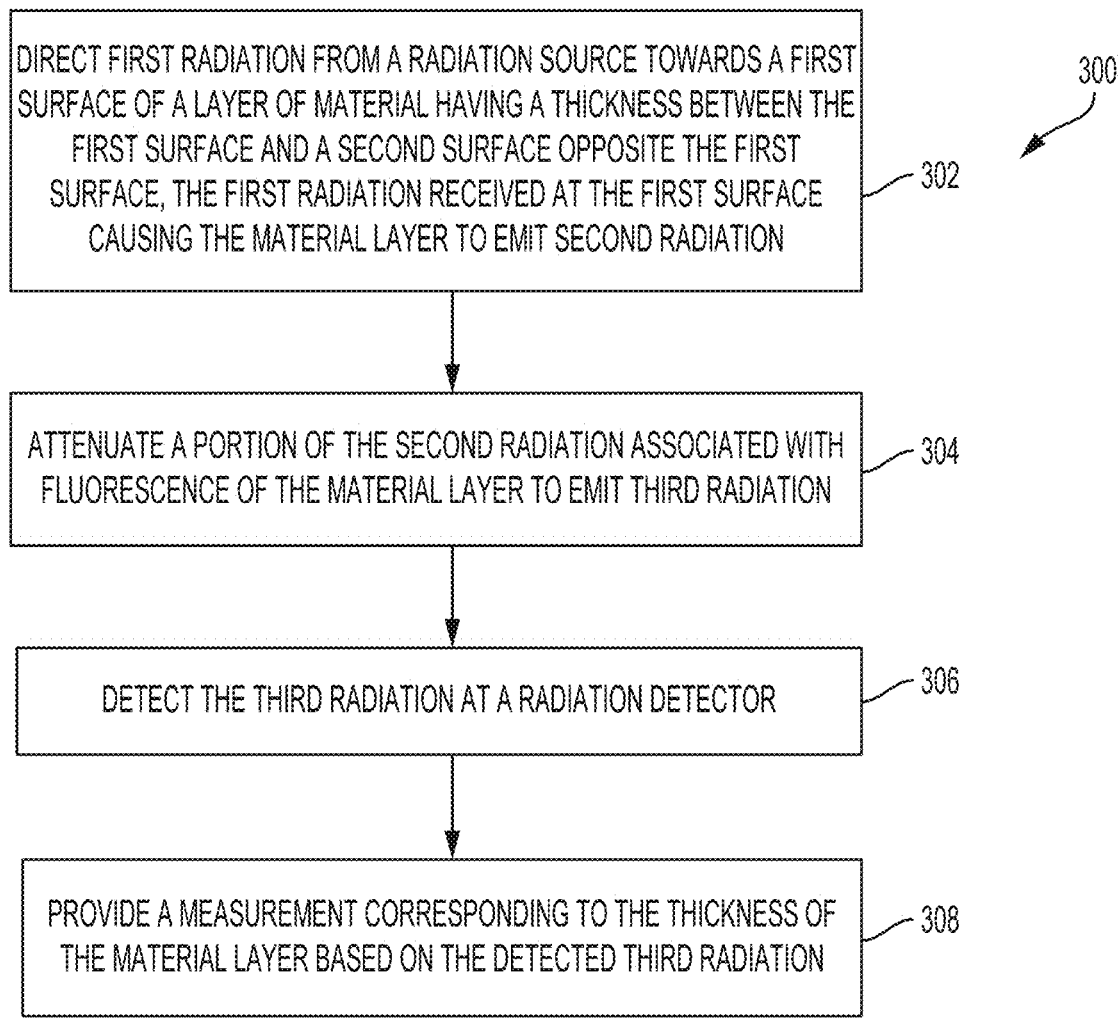

The foregoing summary, as well as the following detailed description of embodiments, is better understood when read in conjunction with the appended drawings. For the purpose of illustrating the present disclosure, the drawings show example embodiments of the disclosure; the disclosure, however, is not limited to the specific methods and instrumentalities disclosed. In the drawings:

FIGS. 1A-C illustrate systems for measuring a thickness of a layer of a material using electromagnetic radiation, according to some embodiments;

FIG. 2 illustrates a graph that shows radiation attenuation effects for different types of material compositions, according to some embodiments; and FIG. 3 illustrates a method for measuring a thickness of a layer of a material using electromagnetic radiation, according to some embodiments.

DETAILED DESCRIPTION

Described below are system, method, and apparatus embodiments that use a radiation-based gauge to measure a thickness of a layer of material using electromagnetic radiation. In some embodiments, the radiation-based gauge transmits first radiation towards the material layer disposed between a radiation source of the first radiation and a radiation detector. In some embodiments, the radiation source and the radiation detector can be disposed on the same side of the material layer. In some embodiments, the first radiation can be referred to as primary radiation representing the source radiation. As a result of receiving and interacting with the first radiation, the material layer can emit second radiation that includes an unabsorbed portion of the first radiation and includes fluorescent radiation (i.e., sometimes referred to as secondary radiation). To improve thickness-measurement accuracy, the radiation-based gauge includes a filter disposed between the material layer and the radiation detector and configured to filter preselected energy-levels (and corresponding wavelengths) associated with fluorescence emitted by the material layer. In some embodiments, the radiation detector can be configured to provide a measurement corresponding to the thickness of the material layer based on the filtered second radiation. For example, the radiation detector may provide the measurement in a unit of length (e.g., millimeters or microns) or an area density (e.g., grams per square meter).

FIGS. 1A-C illustrate systems 100A-C for measuring a thickness of material 116 using electromagnetic radiation, according to some embodiments. As shown in FIG. 1A, system 100A includes a radiation-source system 102A that generates and emits a radiation beam 130C (i.e., sometimes referred to as primary radiation beam and indicates source radiation) towards a layer of material 116 (i.e., also referred to as material layer). As shown in FIG. 1A, material layer 116 has a thickness defined by a first surface 116A and a second surface 116B opposite first surface 116A. In some embodiments, as shown in FIG. 1A, material layer 116 is disposed between radiation-source system 102A and a radiation-detection system 120A configured to provide a measurement corresponding to the material thickness based on radiation beam 130D emitted by material layer 116.

In some embodiments, radiation beam 130C can be emitted substantially perpendicular (e.g., within a degree of 90 degrees) to material layer 116. In some embodiments, radiation beam 130C can be directed at material layer 116 at a predefined angle. In some embodiments, radiation beam 130C can be emitted as ionizing electromagnetic radiation, which including photon with high enough energy (e.g., kinetic energy) to ionize atoms within material layer 116. In some embodiments, radiation beam 130C can include X-rays, gamma rays, radio waves, ultraviolet rays, infrared, Terahertz, etc. In some embodiments, radiation beam 130C can be emitted as other types of energy beams such as ultrasound or ionizing, non-electromagnetic radiation such as particle-based radiation (e.g., Alpha radiation or Beta radiation).

In some embodiments, material layer 116 can include a sheet or a strip of material having a thickness defined by a first surface 116A and a second surface 116B opposite first surface 116A. In some embodiments, the sheet or strip of material may have a substantially uniform thickness. In some embodiments, material layer 116 can be composed of a single element or a plurality of elements. For example, material layer 116 may be composed of aluminum, steel, stainless steel, various alloys including steel, etc. In some embodiments, material layer 116 can be substantially composed of a single element by mass or a single alloy by mass. For example, material layer 116 may include a sheet of aluminum, steel, etc. In some embodiments, the term "substantially" as used in the present disclosure herein can refer to 90% or more. For example, a material that substantially includes Aluminum refers to a material whose mass is 90% or more Aluminum.

In some embodiments, the term "layer" as used in the present disclosure herein can include a single layer or a plurality of layers (i.e., sublayers). In some embodiments, each layer in the plurality of layers may have an associated, respective thickness. For example, material layer 116 may include multi-layers or include a composite of multi-elements at various percentages. For example, material layer 116 may be steel at a certain grade that classifies the composition and physical properties of the steel.

In some embodiments, radiation-source system 102A includes a user interface 103, a controller 104, a high-voltage generator 106, a radiation generator 108, a beam collimator 110, and a beam-hardening filter 112. In some embodiments, radiation-source system 102 can include a dust cover 114A made from a material having a low attenuation. For example, dust cover 114A may include a thin layer of a material having a low absorption window such as polyethylene terephthalate (PET). For example, the thin layer may be less than 1 mm such as between 0.5 and 1 mm.

In some embodiments, high-voltage generator 106 can be configured to generate a high voltage to enable electromagnetic radiation to be generated by radiation generator 108. In some embodiments, high-voltage generator 106 can be configured to generate a voltage level (e.g., 50 kV) from a range of voltages (e.g., between 5 kV and 500 kV) based on the type of material of layer 116 as well as the range of thicknesses to be measured. For example, high-voltage generator 106 may generate a voltage range of 0-500 kV, 5-300 kV, 5-200 kV, 5-100 kV, or 10-50 kV.

In some embodiments, radiation generator 108 can be configured to generate radiation beam 130A based on the high voltage generated by high-voltage generator 106. In some embodiments, radiation generator 108 can generate radiation beam 130A having a spectrum of energies based on the voltage level of high-voltage generator 106 and whose endpoint energy of the energy spectrum corresponds to the voltage level. For example, operating radiation generator 108 at a voltage level of 50 kV may generate radiation beam 130A having photons with energy levels ranging from a few keV (e.g., 1-2 keV) up to 50 keV. In another example, operating radiation generator 108 at a voltage level of, for example, 100 kV may generate radiation beam 130A having an energy spectrum from a few keV up to 100 keV.

In some embodiments, radiation beam 130A can be configured to operate in a specific range of energy levels based on the range of thickness of material layer 116 to be measured and the composition of material layer 116. In some embodiments, as shown in FIG. 1A, radiation generator 108 can include an X-ray tube configured to generate radiation beam 130A in the form of X-rays based on the voltage level generated by high-voltage generator 106. Depending on the anode material and the potential difference between the anode and the cathode of the X-ray tube, radiation generator 108 can emit radiation beam 130A in the form of continuum radiation (i.e., Bremsstrahlung radiation). Additionally, the energy spectrum of radiation beam 130A may include fluorescent peaks characteristic of the anode materials superimposed on the continuum radiation.

In some embodiments, collimator 110 can be configured to shape the beam spot beam solid angle, or both the beam spot and the beam solid angle of radiation beam 130C with respect to material layer 116. For example, collimator 110 may be configured to filter a stream of radiation beam 130A so that only those travelling parallel to a specified direction are allowed through and shown as radiation beam 130B. Other examples of collimator 110 may include, without limitation, a pinhole collimator, a converging collimator, a cone-beam collimator, etc. In some embodiments, collimator 110 can include a beam shutter 111 configured to control operation of collimator 110 to shape or limit a beam solid angle of radiation beam 130A generated by radiation generator 108.

In some embodiments, beam hardening filter 112 can be configured to apply beam hardening to radiation beam 130B before being emitted as radiation beam 130C (i.e., sometimes referred to as primary radiation). In some embodiments, beam hardening filter 112 can include a material configured to selectively attenuate lower energy photons of radiation beam 130B. In some embodiments, material of beam hardening filter 112 can include various metals such as Aluminum, Copper, Steel, Tungsten, etc. depending on material composition of material layer 116 to be measured and a range of thickness of material layer 116 to be measured. In some embodiments, the lower energy photons can include photons having an energy level below 20 keV, below 15 keV, or below 5 keV. In some embodiments, beam hardening filter 112 can include material that acts as a bandpass filter to allow a bandwidth of energy levels of radiation beam 130B to be emitted as radiation beam 130C. In some embodiments, positioning beam hardening filter 112 after collimator 110 can enable radiation beam 130C being emitted from radiation-source system 102 to have an increased mean beam energy (i.e., "hardened").

In some embodiments, user interface 103 can enable an operator to control operation of radiation-source system 102A through controller 104. In some embodiments, user interface 103 can be provided via a network interface that provides a web-based interface. In some embodiments, the network interface can be configured to access wired and/or wireless networks that span a wide area network (WAN) such as the Internet, an intranet, a local area network (LAN), a metropolitan area network (MAN), etc. In some embodiments, the network interface may use any of a plurality of communications standards, protocols, and technologies, including but not limited to Global System for Mobile Communications (GSM), long term evolution (LTE), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), Wi-MAX, Ethernet, etc.

In some embodiments, radiation beam 130C emitted by radiation-source system 102A towards material layer 116 can cause material layer 116 to emit radiation beam 130D. As discussed above, attenuation of radiation beam 130C occurs due to the interaction between photons within radiation beam 130C and the atoms within material layer 116. In some embodiments, radiation beam 130C can be configured to supply photons having an energy level below 500 keV. In this energy range, attenuation of radiation beam 130C may be caused primarily by the photoelectric effect, in which energy of some photons in radiation beam 130C is absorbed by atoms in material layer 116. Accordingly, emitted radiation beam 130D may preclude a portion of the photons within radiation beam 130C. Additionally, due to the orbital shell characteristics of elements within material layer 116, the photoelectric effect may cause the emission of photons with a lower energy level than an incident photon, also known as fluorescence and sometimes referred to as secondary radiation. These lower-energy photons have energy levels dependent on the binding energies as well as the orbital shell characteristics of elements within material layer 116. Therefore, radiation beam 130D can include a non-absorbed portion of radiation beam 130C (i.e., primary radiation) and also include fluorescent radiation (i.e., secondary radiation) caused by the photoelectric effect.

In some embodiments, detector system 120A can be configured to provide a measurement corresponding to a thickness of material layer 116 based on an attenuation of radiation beam 130C passing through material layer 116 and received as radiation beam 130D. In some embodiments, detector system 120A includes an energy filter 122A, a radiation detector 124A, front-end electronics 126, a controller 128, and a display 130. In some embodiments, detector system 120 includes a dust cover 114B having a low attenuation. Dust cover 114B may correspond to dust cover 114A and similarly include, for example, a thin layer of polyethylene terephthalate (PET).

In some embodiments, energy filter 122A can include one or more filter layers configured to attenuate a predetermined range of wavelengths corresponding to a range of energy levels associated with fluorescence from material layer 116. In some embodiments, energy filter 122A can be configured to filter lower energy photons having an energy level below 50 keV, below 40 keV, below 30 keV, below 20 keV, below 15 keV, below 10 keV, below 9 keV, below 8 keV, below 7 keV, below 6 keV, or below 5 keV.

Energy filter 122A can be configured to emit filtered radiation beam 130D as radiation beam 130E. As is well known in the relevant arts, the relationship between a photon wavelength and its energy is specified by the Planck-Einstein relation: $E=(h*c)/\lambda$ where E is photon energy (eV), h is Planck's constant, c is the speed of light (m/s), and $\lambda$ is wavelength (m). In some embodiments, the range of wavelengths and corresponding range of energy levels to be filtered can be determined based on orbital shell characteristics of different types of elements within material layer 116. In some embodiments, the range of energy levels can be predetermined based on the preconfigured energy of radiation beam 130C and one or more K-edge energy levels associated with material layer 116. In some embodiments, energy filter 122A can be composed of various metals such as Aluminum, Copper, Steel, Tungsten, or a combination thereof depending on the range of energy levels to be filtered. In some embodiments, energy filter 122A can include a plurality of layers where each layer is configured to filter a corresponding range of energy levels.

In some embodiments, radiation detector 124A can be configured to detect radiation beam 130E emitted by energy filter 122A. In some embodiments, radiation detector 124A can be configured to generate a signal corresponding to an intensity (i.e., irradiance) metric of radiation beam 130E. For example, the signal may be an electrical current (e.g., an AC current or a DC current) that is proportional to the intensity of radiation beam 130E, a train of current or light pulses whose characteristic correspond to the intensity of radiation beam 130E, or sound waves with a characteristic corresponding to the intensity of radiation beam 130E, etc.

In some embodiments, radiation detector 124A can include energy-spectrum agnostic detectors configured to generate a signal representative of an aggregate intensity of radiation beam 130E. For example, radiation detector 124A may include an ionization chamber, which measures ionization of gas within the ionization chamber caused by radiation beam 130E. In these embodiments, the ionization chamber can be configured to apply a bias voltage between the cathode and the anode of the ionization chamber to generate an electric field to collect charged fragments of ionization at the appropriate polarity electrodes (e.g., positive ions are attracted to the cathode and electrons move towards the anode).

In some embodiments, the ionization chamber can be configured to generate a signal (e.g., an electric current) resulting from the ionization caused by radiation beam 130E and the generated signal can correspond to the intensity of radiation beam 130E. In some embodiments, the gas can include Argon, Xenon, P10, air, etc. In some embodiments, the ionization chamber can be operated in linear mode, in proportional mode, or in Geiger mode depending on the electric field to be generated and the cathode geometry.

In some embodiments, radiation detector 124A can include multi-channel detectors (e.g., multi-chambers) to detect a radiation intensity profile of radiation beam 130E. In some embodiments, in contrast to radiation detectors that can detect an energy spectrum of radiation beam 130E, radiation detector 124A may include radiation detectors that are energy-spectrum specific. Examples of such radiation detectors may include Photo Multiplier Tubes (PMT), some solid state detectors (e.g., based on Silicon), or gas-based detectors, etc. In some embodiments, radiation detector 124A can generate a signal representative of an aggregate photon energy level of radiation beam 130E, whose measurement is sensitive to any fluorescent energy. Accordingly, by including energy filter 122A, any fluorescent energy can be filtered (e.g., absorbed) before being detected and processed by radiation detector 124A.

In some embodiments, radiation detector 124A can include a semiconductor detector that uses a semiconductor to measure an effect of incident charged particles or photons caused by radiation beam 130E. In some embodiments, the semiconductor detector can include a silicon detector, a germanium detector (e.g., a high-purity germanium (HPGe) detector), a diamond detector, a cadmium telluride detector, or a cadmium zinc telluride detector. In some embodiments, the type of radiation detector 124A can be provided depending on the material layer and the thickness range to be measured. For example, silicon detectors may not be able to effectively attenuate radiation (e.g., X-rays and gamma-rays) with energies greater than 20 keV, and therefore this limits the range of thickness as well as the material type.

In some embodiments, radiation detector 124A can include a scintillation detector. In some embodiments, the scintillation detector includes a scintillation crystal configured to luminesce when excited by ionizing radiation of radiation beam 130E. In some embodiments, the scintillation crystal can include materials such as Sodium Iodide, Cesium Iodide, LSO, Lead Tungstate, BGO, Lantanum Bromide and chlorides, Plastic scintillators, liquid scintillators (linear and benzene ring based), scintillating fibers and fiber bundles, Zink sulfide, etc. In these embodiments, radiation detector 124 can include one or more photo-detectors (e.g., Silicone photodiodes, Avalanche photodiodes, photomultipliers, etc.) configured to detect the luminescence (i.e., light) emitted by the scintillation crystal.

In some embodiments, front end electronics 126 can be configured to amplify or process the signal generated by radiation detector 124A. For example, front end electronics 126 may include amplifiers, digital circuitry, digital signal processing, etc.

In some embodiments, controller 128 can be configured to provide a measurement corresponding to the thickness of material layer 116 based on radiation beam 130E as detected by radiation detector 124A. For example, controller 128 may calculate the thickness measurement (e.g., a unit of length or an area density) based on a signal amplified or processed by front end electronics 126 and representative of radiation beam 130E, as will be further described below. In some embodiments, controller 128 can be configured to display the calculated measurement on display 130. In some embodiments, controller 128 can be configured to continuously or periodically calculate the layer thickness.

In some embodiments, to determine the measurement corresponding to the thickness, controller 128 can select a stored configuration to apply to the signal based on user input from, for example, user interface 103. In some embodiments, the user input can include a type of material (e.g., an elemental composition) of material layer 116 whose thickness is to be measured, a range of thicknesses to be measured, or a combination thereof. In some embodiments, radiation-detection system 120A can include a plurality of energy filters and depending on the user input, controller 128 can be configured to select a corresponding energy filter 122A for use from the plurality of energy filters. In some embodiments, depending on the user input, controller 128 can be configured to display to a user (on display 130) the type of energy filter 122 A that needs to be inserted within radiation-detection system 120A.

In some embodiments, the signal can be configured to be proportional to the total charge $Q_T$ as detected and collected by radiation detector 124A from radiation beam 130E based on material layer 116 having a thickness t. The total charge $Q_T$ can be associated with the charge associated with and collected across an energy spectrum (i.e., from zero to a maximum energy) provided by radiation beam 130C.

In some embodiments, the signal (i.e., s) can be configured to be proportional to $Q_T$ according to the following relationship: $s=[Q_T-Q_0]/[Q_{max}-Q_0]$ where $Q_0$ represents an offset of the system (i.e., without material layer 116 positioned between radiation-source system 102 and radiation-detection system 120) and $Q_{max}$ represents a charge of radiation detector 124 with material layer 116 having an "infinite" thickness. In some embodiments, the "infinite" thickness can be at least 50,000 g/cm$^2$, which is large compared to the target range of material thickness to be measured.

In some embodiments, to calculate a measurement corresponding to the thickness of material layer 116, controller 128 can be configured to apply a logarithmic function to the signal (i.e., s) to generate a log value (i.e., x). For example, controller 128 may generate the log value according to the following function: x=ln(s). In some embodiments, controller 128 can be configured to apply a polynomial function or an orthogonal function spanning the range of measurements to the log value to calculate the measurement corresponding to the thickness of material layer 116. In some embodiments, the orthogonal function can include orthogonal trigonometric functions, orthogonal polynomials, among other types of orthogonal functions. In some embodiments, the polynomial function can have a plurality of terms with a plurality of corresponding coefficients. In some embodiments, the number of terms and corresponding coefficients are predetermined based on experimental values obtained based on the range of thickness of material layer 116 to be measured. For example, the polynomial function may have four terms: $t=a_0+a_1x+a_2x^2+a_3x^3+a_4x^4$ where $a_0$, $a_1$, $a_2$, $a_3$, and $a_4$ are the predetermined coefficients and x is a log value (e.g., x=ln(s)).

FIGS. 1B-C illustrate systems 100B-C for measuring a thickness of material layer 116 using electromagnetic radiation, according to some embodiments. In each of systems 100B-C, radiation-source systems 102B-C and radiation-detection systems 120B-C can be positioned on the same side (e.g., on the side of first surface 116A) as material layer 116. In some embodiments, radiation-source systems 102B-C and radiation-detection systems 120B-C can correspond to radiation-source system 102A and radiation-detection system 120A, respectively, as described above with respect to FIG. 1A. Like radiation-detection system 120A, each of radiation-detection systems 120B-C can include respective energy filters 122B-C positioned between material layer 116 and respective radiation detectors 124B-C.

In some embodiments, radiation-detection systems 120B-C operate like radiation-detection system 120A and are configured with respective energy filters 122B-C to selectively filter a predetermined range of energy levels (i.e., wavelengths) that correspond to fluorescent characteristics of material layer 116. However, in contrast to radiation-detection system 120A that relies on the photoelectric effect to provide a measurement corresponding to the thickness of material layer 116, radiation-detection systems 120B-C rely on the Compton effect (i.e., sometimes referred to as Compton scattering or incoherent scattering) caused by radiation-source systems 102B-C to provide the measurement. While the radiation detected by radiation-detection systems 120B-C is primarily caused by the Compton effect, the detected radiation may also include a portion of radiation (e.g., fluorescent radiation) caused by the Photoelectric effect, as will be further described below.

As shown in system 100B, radiation-source system 102B can emit radiation beam 132A (i.e., primary radiation) at material layer 116. For example, radiation beam 132A may be emitted at a preconfigured angle or be emitted substantially perpendicular to first surface 116A. In some embodiments, Compton scattering occurs when an incident photon in radiation beam 132A is deflected from its original path based on an interaction with an atom (e.g., an electron) within material layer 116 and as a result travels on an altered path with less energy. The photon energy change depends on the angle of scattering and the photon energy. Accordingly, due to the Compton effect, a portion of radiation beam 132A would be deflected and emitted as backscattered radiation. In some embodiments, radiation beam 132A can cause material layer 116 to emit radiation beam 132B that includes backscattered radiation and fluorescent radiation, as described above with respect to FIG. 1A. Like energy filter 122A, energy filter 122B can be configured to filter the fluorescent radiation and emit radiation beam 132C representing filtered radiation beam 132B. Then, radiation-detection system 120B can be configured to provide a measurement corresponding to a thickness of material layer 116 based on the intensity of radiation beam 132C detected by radiation detector 124B.

In some embodiments, system 100C can include a reflector 117 disposed on the side of second surface 116B opposite that of radiation-source system 102C and radiation-detection system 120C. In some embodiments, reflector 117 can be solid material such as a metal plate. As shown in FIG. 1C, radiation-source system 102C can be configured to emit radiation beam 134A at first surface 116A of material layer 116. Material layer 116 may be configured to emit radiation beam 134B that includes an unabsorbed portion of radiation beam 134A and fluorescent radiation, each caused by the photoelectric effect described above with respect to FIG. 1A. Reflector 117 can emit radiation beam 134C that represents a backscatter of radiation beam 134B based on the Compton effect. Additionally, radiation beam 134C may include fluorescent radiation generated by reflector 117. In some embodiments, material layer 116 can be configured to emit radiation beam 134D that includes a portion of the photons from radiation beam 134A due to the Compton effect, a portion of the photons from radiation beam 134C due to the photoelectric effect, and fluorescent radiation generated based on interaction of photons from radiation beams 134A and 134C with atoms in material layer 116.

FIG. 2 illustrates a graph 200 that shows radiation attenuation effects for different types of material compositions, according to some embodiments. As shown, graph 200 plots the mass-energy attenuation coefficient ($cm^2/g$) 204 on a logarithmic scale for various elemental compositions as shown in legend 206 at different X-ray energy levels 202 (keV). For example, legend 206 indicates the following elemental compositions with atomic numbers (i.e., Z) shown for single elements: beryllium (Z=4), aluminum (Z=13), titanium (Z=22), tin (Z=50), tungsten (Z=74), lead (Z=82), copper (Z=29), and BoPET (biaxially-oriented polyethylene terephthalate) (e.g., Mylar), which is a polyester film made from various elements (i.e., $C_{10}H_8O_4$). As shown in chart 200, because BoPET has low attenuation across X-ray energy levels 202 and contains no k-edges in the energy spectrum used to measure a range of material thickness, the photoelectric effect of BoPET can be accounted for during thickness gauging.

As discussed above, the K-edge refers to the binding energy of the K-shell electron in an atom. The photoelectric effect refers to the emission of electrons or other free carriers when radiation is directed at a material. When a photon having an energy level close to and exceeding the K-edge of the atom, that photon becomes more likely to be absorbed than a photon having photon energy just below the K-edge and results in photoelectric absorption. For example, as shown in graph 200, the K-edge characteristics of a composition can cause a sudden increase in the mass-energy attenuation coefficient of photons occurring at photon energies just above the K-edges for that composition. For example, the K-edge 212 of titanium is at about 5 keV and the K-edge 210 of Silicon is at about 1.8 keV. As discussed above, at the K-edge energy levels, fluorescent radiation can be generated, which may decrease the accuracy of thickness-gauge systems.

FIG. 3 illustrates a method 300 for measuring a thickness of a material layer using electromagnetic radiation, according to some embodiments. In some embodiments, method 300 can be performed by a thickness-gauge system such as radiation-based gauge 100A-C, as described above with respect to FIGS. 11A-C. In some embodiments, the thickness-gauge system includes the material layer positioned between a radiation source and a radiation detector, as shown in FIG. 1A. In some embodiments, the thickness-gauge system includes the radiation source and the radiation detector positioned on the same side as the material layer, as shown in FIGS. 1B-C.

In step 302, the thickness-gauge system directs first radiation from the radiation source towards a first surface of a layer of material having a thickness between the first surface and a second surface opposite the first surface. In some embodiments, the first radiation received at the first surface causes the material layer to emit second radiation. In some embodiments, the first radiation can include ionizing electromagnetic radiation such as X-rays or gamma rays.

In some embodiments, the second radiation emitted by the material layer includes a portion of photons from the first radiation and includes fluorescent radiation emitted by the material layer as a result of interactions between the photons of the first radiation and the atoms of the material layer. In some embodiments, the second radiation emitted by the material layer includes a first portion of photons from the first radiation and precludes a second portion of photons from the first radiation that have been absorbed by the material layer due to the photoelectric effect. In some embodiments, the second radiation emitted by the material layer includes a third portion of photons from the first radiation that have been deflected according to the Compton effect. As discussed above, at low energy levels (e.g., below 500 keV), photoelectric effect contributes the largest effect out of the main types of radiation-matter interactions to attenuation of the first radiation.

In step 304, the thickness-gauge system attenuates a portion of the second radiation associated with fluorescence of the material layer to emit third radiation. Accordingly, the third radiation includes filtered second radiation. In some embodiments, the portion of the second radiation is attenuated by a filter positioned between the material layer and the radiation detector, as shown in FIGS. 1A-C.

In some embodiments, the filter includes one or more filter layers that are configured to filter a range of energy levels associated with the fluorescence of the material layer, as discussed above with respect to FIG. 1A. In some embodiments, the filter can be composed of a material configured to filter photons from the second radiation that have energy levels below a predetermined threshold. In some embodiments, the predetermined threshold can be at least 5 keV, 6 keV, 7 keV, 8 keV, 9 keV, 10 keV, 15 keV, or 20 keV. In some embodiments, the predetermined threshold can be less than 50 keV, 20 keV, 15 keV, 10 keV, 9 keV, 8 keV, 7 keV, or 6 keV. In some embodiments, the predetermined threshold can be between 5-50 keV, 5-20 keV, 5-10 keV, or 6-10 keV.

In some embodiments, the filter includes a plurality of filter layers to filter a plurality of energy levels. In some embodiments, the range of energy levels to be filtered is predetermined based on an elemental composition of the material layer and orbital shell characteristics associated with each element in the elemental composition.

In some embodiments, in contrast to traditional radiation fluorescence analysis used to determine elemental composition of a material, the thickness-gauge system described herein seeks to attenuate and block fluorescent radiation to reduce the sensitivity of thickness measurements to elemental composition and the range of material thicknesses to be measured. By using the filter, as described above with respect to FIGS. 1A-C, the thickness-gauge system can be configured to use an energy-spectrum agnostic radiation detector to provide a measurement corresponding the thickness of the material layer.

In step 306, the thickness-gauge system detects the third radiation at the radiation detector. In some embodiments, a radiation detector (e.g., radiation detector 124) of the thickness-gauge system can be configured to quantify an intensity of the third radiation. In some embodiments, the radiation detector can be configured to generate a signal corresponding to the intensity of the third radiation. For example, the signal may be an electrical current, a pulse train, a sound wave, etc. In some embodiments, the generated signal is configured to be proportional to the intensity. For example, when the first radiation is X-ray, the radiation detector may be an ionization chamber configured to generate an electrical current whose magnitude is proportional to the intensity.

In step 308, the thickness-gauge system provides a measurement corresponding to the layer thickness based on the detected third radiation. In some embodiments, the provided measurement includes a unit of length corresponding to the length of the layer thickness. In some embodiments, the provided measurement includes an area density corresponding to the layer thickness. In particular, a person of skill in the art would recognize that the area density and the thickness length can be easily derived given one of the quantities according to the following relationship: area density=thickness length*density.

In some embodiments, a controller (e.g., controller 128) of the thickness-gauge system can be configured to calculate the measurement based on the signal generated by the radiation detector and representative of a detected intensity of the detected third radiation. In some embodiments, the controller can be configured to apply a logarithmic function to the measured current of the signal to determine a log value and then apply a stored configuration to the log value to calculate the measurement corresponding to the thickness. For example, the stored configuration may be a polynomial function that is applied to the log value to calculate the measurement. In some embodiments, the controller can be configured to select the stored configuration from a plurality of stored configurations based on user input. For example, the user input may specify the stored configuration. In some embodiments, the user input may include a type of material to be measured and/or a range of thicknesses to be measured.

In some embodiments, the coefficients in the polynomial function are predetermined (and provided in the stored configuration) based on an elemental composition of the material layer and a range of thicknesses of the material layer to be measured. In some embodiments, the coefficients in the polynomial function are predetermined based on a plurality of elemental compositions having similar material properties. For example, the plurality of elemental compositions may have attenuation characteristics or fluorescent characteristics that are substantially the same for a range of thicknesses to be measured. In some embodiments, the controller can be configured to display the calculated measurement on a display of the thickness-gauge system. For example, the calculated measurement may be displayed as a unit length (e.g., millimeters or microns) or an area density (e.g., grams per meter squared).

The preceding description sets forth exemplary methods, parameters and the like. It should be recognized, however, that such description is not intended as a limitation on the scope of the present disclosure but is instead provided as a description of exemplary embodiments. The illustrative embodiments described above are not meant to be exhaustive or to limit the disclosure to the precise forms disclosed. Many modifications and variations are possible in view of the above teachings. The embodiments were chosen and described to best explain the principles of the disclosed techniques and their practical applications. Others skilled in the art are thereby enabled to best utilize the techniques, and various embodiments with various modifications as are suited to the particular use contemplated.

Although the disclosure and examples have been thoroughly described with reference to the accompanying figures, it is to be noted that various changes and modifications will become apparent to those skilled in the art. Such changes and modifications are to be understood as being included within the scope of the disclosure and examples as defined by the claims. In the preceding description of the disclosure and embodiments, reference is made to the accompanying drawings, in which are shown, by way of illustration, specific embodiments that can be practiced. It is to be understood that other embodiments and examples can be practiced, and changes can be made without departing from the scope of the present disclosure.

Although the preceding description uses terms first, second, etc. to describe various elements, these elements should not be limited by the terms. These terms are only used to distinguish one element from another.

Also, it is also to be understood that the singular forms "a," "an," and "the" used in the preceding description are intended to include the plural forms as well unless the context indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

In some embodiments, a non-transitory computer-readable storage medium stores one or more programs configured to be executed by one or more processors of a device, the one or more programs including instructions for implementing any of the steps described or claimed herein. The present disclosure also relates to a device for performing the operations herein. This device may be specially constructed or configured for the required purposes and include, for example, an application specific integrated circuits (ASIC), a field-programmable gate array (FPGA), a digital signal processor (DSP), or it may include a general-purpose computer selectively activated or reconfigured by a computer program stored in the computer.

Such a computer program may be stored in a non-transitory, computer computer-readable storage medium, such as, but not limited to, any type of disk, including floppy disks, optical disks, CD-ROMs, magnetic-optical disks, read-only memories (ROMs), random access memories (RAMs), electrically program read-only memories (EPROMs), electronically erasable program read-only memories EEPROMs, magnetic or optical cards, application specific integrated circuits (ASICs), a USB flash drive, or any type of media suitable for storing electronic instructions, and each coupled to a computer system bus. Furthermore, the devices referenced in this disclosure may include a single processor or may be architectures employing multiple processor designs for increased computing capability.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems appears from the description above. Also, the present disclosure is not described with reference to any particular programming language. It will be appreciated that a variety of programming languages may be used to implement the teachings of the present disclosure as described herein.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

What is claimed is:

1. A system for measuring a thickness of a material layer using electromagnetic radiation, comprising:
    a radiation source configured to direct first radiation towards a first surface of a layer of material comprising a thickness between the first surface and a second surface opposite the first surface, wherein the first radiation causes the material layer to emit second radiation, wherein the radiation source and the radiation detector are disposed on opposite sides of the material layer;
    a filter positioned between the material layer and a radiation detector and configured to attenuate a portion of the second radiation associated with fluorescence of the material to emit third radiation,
    wherein the radiation detector is configured to detect the third radiation; and
    a controller is configured to provide a measurement corresponding to the thickness of the material layer based on the detected third radiation.

2. The system of claim 1, wherein the filter comprises one or more filter layers that are configured to filter a range of energy levels associated with the fluorescence of the material layer.

3. The system of claim 2, wherein the range of energy levels is predetermined based on an elemental composition of the material layer and orbital shell characteristics associated with each element in the elemental composition.

4. The system of claim 1, wherein the filter is configured to filter from the second radiation photons having an energy level below a predetermined threshold.

5. The system of claim 4, wherein the predetermined threshold is associated with an elemental composition of the material layer and orbital shell characteristics associated with each element in the elemental composition.

6. The system of claim 1, wherein the first radiation comprises X-rays.

7. The system of claim 1, wherein the first radiation comprises gamma radiation.

8. The system of claim 1, wherein the measurement comprises a unit of length.

9. The system of claim 1, wherein the measurement comprises an area density.

10. The system of claim 1, comprising:
    a display configured to display the measurement corresponding to the thickness of the material layer.

11. A method for measuring a thickness of a material layer using electromagnetic radiation, comprising:
    directing first radiation from a radiation source towards a first surface of a layer of material comprising a thickness between the first surface and a second surface opposite the first surface, wherein the first radiation received at the first surface causes the material layer to emit second radiation;
    attenuating a portion of the second radiation associated with fluorescence of the material layer to emit third radiation;
    detecting the third radiation at a radiation detector; and
    providing a measurement corresponding to the thickness of the material layer based on the detected third radiation, wherein the radiation source and the radiation detector are disposed on opposite sides of the material layer.

12. The method of claim 11, wherein the portion of the second radiation is attenuated by a filter comprising one or more filter layers that are configured to filter a range of energy levels associated with the fluorescence of the material layer.

13. The method of claim 12, wherein the range of energy levels is predetermined based on an elemental composition of the material layer and orbital shell characteristics associated with each element in the elemental composition.

14. The method of claim 11, wherein the portion of the second radiation is attenuated by a filter configured to filter from the second radiation photons having an energy level below a predetermined threshold.

15. The method of claim 14, wherein the predetermined threshold is associated with an elemental composition of the material layer and orbital shell characteristics associated with each element in the elemental composition.

16. The method of claim 11, wherein the first radiation comprises X-rays.

17. The method of claim 11, wherein the first radiation comprises gamma radiation.

18. The method of claim 11, wherein the measurement comprises a unit of length.

19. The method of claim 11, wherein the measurement comprises an area density.

20. The method of claim 11, comprising:
    displaying the measurement corresponding to the thickness of the material layer.

21. A system for measuring a thickness of a material layer using electromagnetic radiation, comprising:
    a radiation source configured to direct first radiation towards a first surface of a layer of material comprising a thickness between the first surface and a second surface opposite the first surface, wherein the first radiation causes the material layer to emit second radiation,
    a filter positioned between the material layer and a radiation detector and configured to attenuate a portion of the second radiation associated with fluorescence of the material to emit third radiation,
    wherein the radiation detector is configured to detect the third radiation; and
    a controller is configured to provide a measurement corresponding to the thickness of the material layer based on the detected third radiation, wherein the first radiation comprises a predetermined energy level and wherein to provide the measurement, the controller is configured to:

measure an intensity of the third radiation; and calculate the measurement corresponding to the thickness of the material layer based on the measured intensity and a default intensity associated with no material layer.

22. The system of claim 21, wherein the filter comprises one or more filter layers that are configured to filter a range of energy levels associated with the fluorescence of the material layer.

23. The system of claim 22, wherein the range of energy levels is predetermined based on an elemental composition of the material layer and orbital shell characteristics associated with each element in the elemental composition.

24. The system of claim 21, wherein the filter is configured to filter from the second radiation photons having an energy level below a predetermined threshold.

25. The system of claim 24, wherein the predetermined threshold is associated with an elemental composition of the material layer and orbital shell characteristics associated with each element in the elemental composition.

26. The system of claim 21, wherein the first radiation comprises X-rays.

27. The system of claim 21, wherein the first radiation comprises gamma radiation.

28. The system of claim 21, wherein the radiation source and the radiation detector are disposed on opposite sides of the material layer.

29. The system of claim 21, wherein the radiation source and the radiation detector are disposed on the same side of the material layer.

30. The system of claim 21, wherein the measurement comprises a unit of length.

31. The system of claim 21, wherein the measurement comprises an area density.

32. The system of claim 21, wherein to provide the measurement, the controller is configured to:

apply a logarithmic function to the measured intensity to determine a log value; and apply a polynomial function to the log value to calculate the measurement, wherein the coefficients in the polynomial function are predetermined based on an elemental composition of the material layer and a range of thicknesses of the material layer to be measured.

33. The system of claim 21, comprising:

a display configured to display the measurement corresponding to the thickness of the material layer.

34. A method for measuring a thickness of a material layer using electromagnetic radiation, comprising:

directing first radiation from a radiation source towards a first surface of a layer of material comprising a thickness between the first surface and a second surface opposite the first surface, wherein the first radiation received at the first surface causes the material layer to emit second radiation;

attenuating a portion of the second radiation associated with fluorescence of the material layer to emit third radiation;

detecting the third radiation at a radiation detector; and providing a measurement corresponding to the thickness of the material layer based on the detected third radiation, wherein the first radiation comprises a predetermined energy level and wherein providing the measurement comprises:

measuring an intensity of the third radiation; and calculating the measurement corresponding to the thickness of the material layer based on the measured intensity and a default intensity associated with no material layer.

35. The method of claim 34, wherein the portion of the second radiation is attenuated by a filter comprising one or more filter layers that are configured to filter a range of energy levels associated with the fluorescence of the material layer.

36. The method of claim 35, wherein the range of energy levels is predetermined based on an elemental composition of the material layer and orbital shell characteristics associated with each element in the elemental composition.

37. The method of claim 34, wherein the portion of the second radiation is attenuated by a filter configured to filter from the second radiation photons having an energy level below a predetermined threshold.

38. The method of claim 37, wherein the predetermined threshold is associated with an elemental composition of the material layer and orbital shell characteristics associated with each element in the elemental composition.

39. The method of claim 34, wherein the first radiation comprises X-rays.

40. The method of claim 34, wherein the first radiation comprises gamma radiation.

41. The method of claim 34, wherein the radiation source and the radiation detector are disposed on opposite sides of the material layer.

42. The method of claim 34, wherein the radiation source and the radiation detector are disposed on the same side of the material layer.

43. The method of claim 34, wherein the measurement comprises a unit of length.

44. The method of claim 34, wherein the measurement comprises an area density.

45. The method of claim 34, wherein providing the measurement comprises:

applying a logarithmic function to the measured intensity to determine a log value; and applying a polynomial function to the log value to calculate the measurement, wherein the coefficients in the polynomial function are predetermined based on an elemental composition of the material layer and a range of thicknesses of the material layer to be measured.

46. The method of claim 34, comprising:

displaying the measurement corresponding to the thickness of the material layer.

* * * * *

UNITED STATES PATENT AND TRADEMARK OFFICE
CERTIFICATE OF CORRECTION

PATENT NO.         : 11,079,222 B2              Page 1 of 1
APPLICATION NO.    : 16/775737
DATED              : August 3, 2021
INVENTOR(S)        : Vahe Ghazikhanian It is certified that error appears in the above-identified patent and that said Letters Patent is hereby corrected as shown below:

In the Specification
Column 11, Line 67, delete "11A-C" and replace with -- 1A-C --.

Signed and Sealed this
Seventh Day of December, 2021

Drew Hirshfeld
*Performing the Functions and Duties of the*
*Under Secretary of Commerce for Intellectual Property and*
*Director of the United States Patent and Trademark Office*